United States Patent
Neri et al.

(10) Patent No.: US 11,423,321 B2
(45) Date of Patent: Aug. 23, 2022

(54) METHOD AND SYSTEM FOR PREDICTING SYSTEM STATUS

(71) Applicant: GM GLOBAL TECHNOLOGY OPERATIONS LLC, Detroit, MI (US)

(72) Inventors: Alessandra Neri, Turin (IT); Maria Camuglia, Francavilla di Sicilia (IT); Alessia Tuninetti, Piemonte (IT); Elena Baralis, Turin (IT); Flavio Giobergia, Turin (IT); Davide Tricarico, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1037 days.

(21) Appl. No.: 16/109,194

(22) Filed: Aug. 22, 2018

(65) Prior Publication Data

US 2020/0065690 A1    Feb. 27, 2020

(51) Int. Cl.
    G06N 5/04    (2006.01)
    G07C 5/08    (2006.01)
(52) U.S. Cl.
    CPC ........... G06N 5/048 (2013.01); G07C 5/0841 (2013.01)
(58) Field of Classification Search
    CPC .................... G06N 5/048; G07C 5/0841
    See application file for complete search history.

(56) References Cited

U.S. PATENT DOCUMENTS

| | | | | |
|---|---|---|---|---|
| 8,245,567 B2* | 8/2012 | Wang | ..................... | F01N 11/007 73/114.75 |
| 8,424,289 B2* | 4/2013 | Narayanaswamy | ......................... | F02D 41/0082 60/285 |
| 10,329,986 B2* | 6/2019 | Wang | ................... | B01D 53/9418 |
| 2011/0258044 A1* | 10/2011 | Kargupta | ............ | G06Q 30/0251 705/14.49 |
| 2012/0197550 A1* | 8/2012 | Cianflone | ............... | F02D 41/22 702/45 |
| 2013/0269317 A1* | 10/2013 | Narayanaswamy | ......................... | F02D 41/0082 60/274 |
| 2018/0306082 A1* | 10/2018 | Hoyos Velasco | ..... | F01N 11/007 |
| 2018/0345986 A1* | 12/2018 | Tricarico | .............. | B60W 40/10 |
| 2019/0024563 A1* | 1/2019 | Wang | ...................... | F01N 11/00 |
| 2019/0284981 A1* | 9/2019 | Neri | ........................ | F01N 11/00 |

(Continued)

OTHER PUBLICATIONS

Francisco Fernandez, "Residual-Based Fault Detection and Isolation— When Data Mining and Soft Computing Overtake the Lack of Expert Knowledge", 2015, pp. 1-145 (Year: 2015).*

*Primary Examiner* — Paulinho E Smith
(74) *Attorney, Agent, or Firm* — Cantor Colburn LLP

(57) ABSTRACT

A system and method of determining system status in a vehicle system. The method including collecting, by a computing system, a plurality of data associated with a test specimen and the vehicle system, selecting a relevant data set of the plurality of data, the selecting based on at least one correlation coefficient associated with the plurality of data, and transforming at least a portion of the selected relevant data to form a transformed data set, the transforming based on mathematical properties. The method also includes collecting statistics associated with the selected relevant data set and the transformed data set to form a statistics data set, classifying the selected relevant data set, transformed data set, and the statistics data set; and predicting a status of a system based on the classifying.

16 Claims, 4 Drawing Sheets

(56) References Cited

U.S. PATENT DOCUMENTS

2019/0376427 A1* 12/2019 Bologna ............... F01N 3/2066
2020/0116093 A1* 4/2020 Geng ........................ F01N 3/10

* cited by examiner

METHOD AND SYSTEM FOR PREDICTING SYSTEM STATUS

INTRODUCTION

The subject embodiments relate to data analysis and prognostics. Specifically, one or more embodiments is directed to a method of analyzing data and predicting sensor status, and more specifically oxygen sensor clogging in a motor vehicle.

Before the introduction of the Internet of Things paradigm, data in vehicles was collected and processed locally at the vehicle by the Engine Control Unit (ECU) for routine operations managing and monitoring of the vehicle and its operation. Limited ECU processing and storage capabilities makes the collection and the analysis of significant amounts of data including historical data infeasible. In the era of communicating and connected vehicles, data can be locally collected and transmitted to a remote location for subsequent analyses and storage with more sophisticated and better performing tools. As a result, automotive manufacturers can leverage the data collected by their own onboard systems to offer additional value to their customers. This value can be readily defined in terms of more transparency as well as additional services and features offered to the customer.

One of the additional services that can be offered is predictive maintenance. Predictive maintenance, or prognostics, aims at the identification of possible malfunctions ahead of time, allowing a prompt intervention before the actual failure. Both manufacturers and customers can benefit from this kind of prediction. The former can issue recalls only when actually needed and before irreversible damage occurs, the latter will not experience unexpected vehicle malfunctions. For these reasons, automotive companies are actively interested in predictive maintenance.

Some sensor systems in vehicles are difficult to analyze and may fail; leaving the customer with unscheduled maintenance and inconvenience. What would be desirable is a predictive maintenance technique that reduces maintenance interruptions and enables customers to be informed in advance of potential maintenance requirements.

SUMMARY

In an embodiment, described herein is a method of determining status of a test specimen associated with a vehicle system. The method includes collecting, by a computing system, a plurality of data associated with a test specimen and the vehicle system, selecting a relevant data set of the plurality of data, the selecting based on at least one correlation coefficient associated with the plurality of data, and transforming at least a portion of the selected relevant data to form a transformed data set, the transforming based on mathematical properties. The method also includes collecting statistics associated with the selected relevant data set and the transformed data set to form a statistics data set, classifying the selected relevant data set, transformed data set and the statistics data set; and predicting a status of the test specimen based on the classifying.

In addition to one or more of the features described above, or as an alternative, further embodiments may include that the collecting comprises operating the vehicle system and acquiring the plurality of data over at least a portion of the operating cycle.

In addition to one or more of the features described above, or as an alternative, further embodiments may include that the collecting comprises operating the vehicle system and acquiring the plurality of data over at least a portion of the operating cycle.

In addition to one or more of the features described above, or as an alternative, further embodiments may include that the plurality of data comprises at least one of sensor data, an operating condition of the vehicle or the sensor, and status of any of the vehicle system, the sensor system and the sensor.

In addition to one or more of the features described above, or as an alternative, further embodiments may include that the plurality of data comprises at least one of a time history.

In addition to one or more of the features described above, or as an alternative, further embodiments may include that the test specimen includes a sensor subsystem and the sensor subsystem includes an oxygen sensor, the oxygen sensor disposed in an exhaust gas stream of a motor vehicle.

In addition to one or more of the features described above, or as an alternative, further embodiments may include that the selecting a relevant data set of the plurality of data comprises an iterative process to identify the most representative variables from the plurality of data, the extraction based on a plurality of correlation coefficients associated with respective pairs of variables of the plurality of data.

In addition to one or more of the features described above, or as an alternative, further embodiments may include that the extraction includes determining an average correlation coefficient for each pair of variables in the plurality of data over a selected number of operating cycles, computing a sum square of the correlation coefficients for each variable, ascertaining a set of variables exhibiting the highest correlation, yet not duplicative with correlation coefficients for other variables; and extracting only variables that are duplicative.

In addition to one or more of the features described above, or as an alternative, further embodiments may include transforming at least a portion of the selected relevant data to form a transformed data set, the transforming based on mathematical properties.

In addition to one or more of the features described above, or as an alternative, further embodiments may include that the transforming includes at least one of averaging, spectral filtering, derivatives, integrals, trigonometric functions, linear and non-linear mathematical functions, and statistical functions.

In addition to one or more of the features described above, or as an alternative, further embodiments may include that the transforming is a derivative over a selected interval.

In addition to one or more of the features described above, or as an alternative, further embodiments may include that the selected interval is at least one of a single sample interval.

In addition to one or more of the features described above, or as an alternative, further embodiments may include that the collecting statistics comprises computing at least one of a percentile, a mean, and a standard deviation for at least one piece of data in the selected relevant data set and the transformed data set to form the statistics data set.

In addition to one or more of the features described above, or as an alternative, further embodiments may include that the classifying the selected relevant data set, transformed data set and the statistics data set comprises applying the selected relevant data set, transformed data set and the statistics data set to a neural network.

In addition to one or more of the features described above, or as an alternative, further embodiments may include that the neural network comprises an input layer having 308 inputs a first hidden layer have 400 nodes, and an output layer having 3 nodes, the three nodes of the output each corresponding to a class associated with a condition of the sensor.

In addition to one or more of the features described above, or as an alternative, further embodiments may include training the neural network based on iterating through the at least a portion of the selected relevant data set, transformed data set and the statistics data set to adjust weights given to each neuron of the neural network.

In addition to one or more of the features described above, or as an alternative, further embodiments may include that the predicting a status of the test specimen based on the classifying identifies the test specimen exhibiting at least one of three states, the three states defined as an OK state, a Pre-alarm state, and an Alarm state.

Also described herein in another embodiment is a system for determining the status of a test specimen. The system includes a vehicle system having at least a sensor system, the sensor system having at least one sensor, and a computing system in operable communication with at least the at least one sensor of the sensor system and the vehicle system, the computing system configured to execute a method of determining status of the test specimen. The method includes collecting, by the computing system, a plurality of data associated with a test specimen and the vehicle system, selecting a relevant data set of the plurality of data, the selecting based on at least one correlation coefficient associated with the plurality of data, and transforming at least a portion of the selected relevant data to form a transformed data set, the transforming based on mathematical properties. The method also includes collecting statistics associated with the selected relevant data set and the transformed data set to form a statistics data set, classifying the selected relevant data set, transformed data set and the statistics data set, and predicting a status of the test specimen based on the classifying.

In addition to one or more of the features described above, or as an alternative, further embodiments may include that the plurality of data comprises at least one of sensor data, an operating condition of the vehicle or the sensor, and status of any of the vehicle system, the sensor system and the sensor.

In addition to one or more of the features described above, or as an alternative, further embodiments may include that the plurality of data comprises at least one of a time history.

In addition to one or more of the features described above, or as an alternative, further embodiments may include that the test specimen includes a sensor subsystem and the sensor subsystem includes an oxygen sensor, the oxygen sensor disposed in an exhaust gas stream of a motor vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. As used herein, the term device refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Predictive maintenance can be approached in two different ways: either through a model-based approach, where the component of interest is modelled to the appropriate level of detail; or through a data-driven approach, where data is collected and processed through pattern recognition and machine learning techniques to infer useful insights and build failure predictors. Previous efforts employing the model-based approach generally provided high-level insights in prognostics, either discussing approaches to address an issue, or identify particular problems to be addressed. Other related work, both model-based and data-driven, covered predictive maintenance case studies, particularly in the area of batteries and electric vehicles.

Described herein, in one or more embodiments, is a method and system for predictive maintenance that is entirely based on a data-driven approach. More specifically, the described embodiments are directed to analyzing the behavior of a particular sensor, in one instance, an oxygen sensor, a sensor that measures the level of oxygen in the exhaust gases. In its operating environment, it is well appreciated that oxygen sensors are subjected to conditions that may hinder its performance and limit its capability of proper operation. As a result, significant performance degradation can result. It will also be appreciated that while the described embodiments are made with respect to an oxygen sensor, such description is only for illustration. The analysis of the described embodiments for predictive maintenance are focused on the identification of early symptoms associated with the degradation of sensors. The described embodiments are presented with respect to applications of an oxygen sensor, but the applicability is not limited to oxygen sensors only, but to any variety of sensor that exhibits degradation in response time because of clogging or other phenomena.

In one or more embodiments described herein is a data-driven framework that, builds a model to predict if the sensor is currently unclogged, almost clogged (since the clogging of the sensor happens gradually), or clogged based on a large number of time series data collected from a vehicle's engine control unit (ECU).

Figure 1:
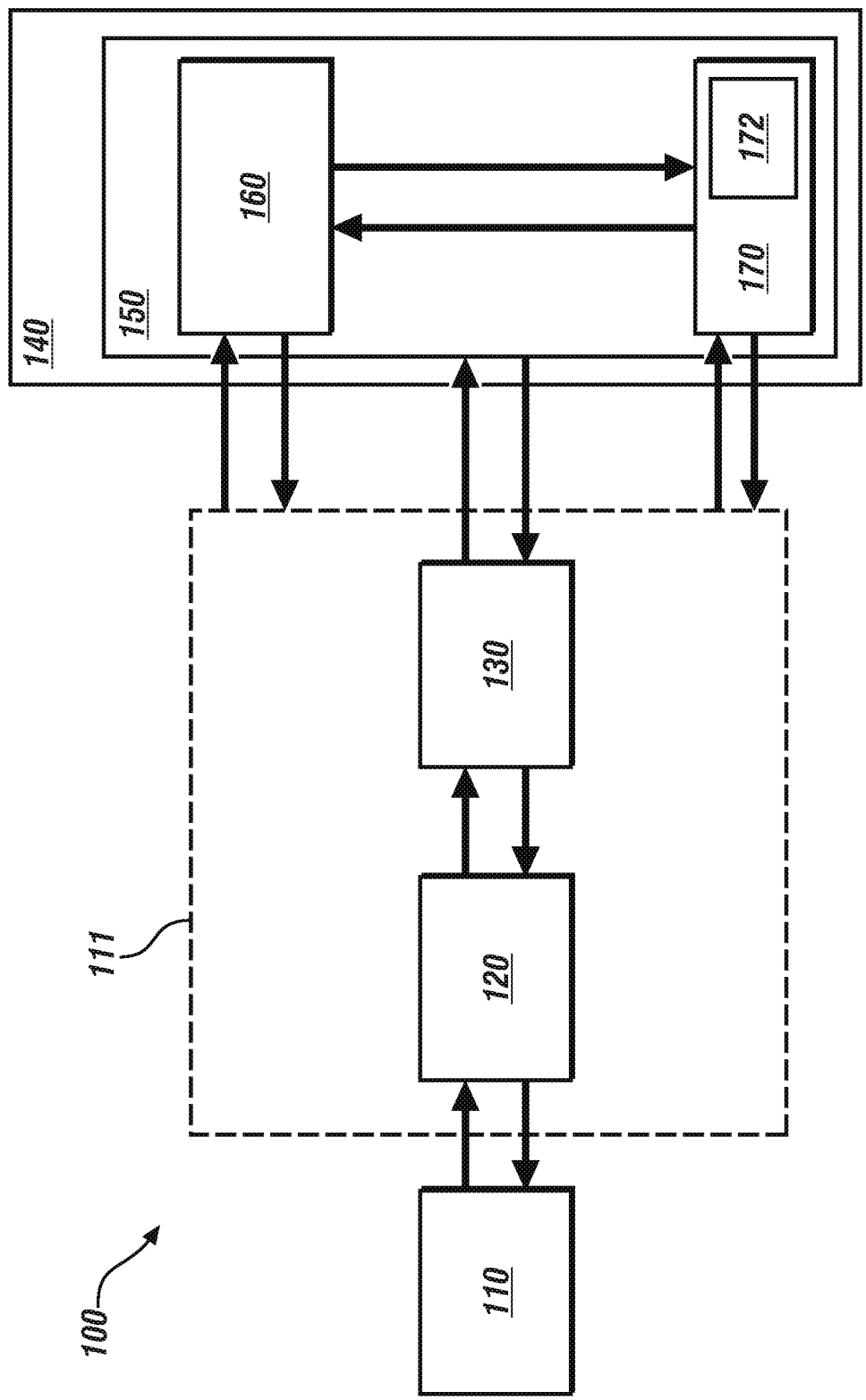
FIG. 1 illustrates a system for testing a test specimen and determining sensor status in accordance with one or more embodiments.

FIG. 1 illustrates a test system 100 in accordance with one or more embodiments. As described above, testing equipment 110 can be used to perform testing of, and receive data regarding, a test specimen shown generally as 140. In one example, test specimen 140 can include a vehicle system 150. In another example, test specimen 140 can also include, and/or communicate with, one or more electronic control units (ECUs) 160, and one or more sensors or sensor systems 170 that may interface with, or be included in, the vehicle system 150. In another embodiment, the test specimen may include the sensor system 170 comprising an oxygen sensor 172. By way of example, for the purpose of description herein, the test specimen is an oxygen sensor 172, however, it should be understood that the test specimen need not be limited to the oxygen sensor 172 and may include other sensors in the sensor system 170, vehicle system 150 and the like.

Signals from oxygen sensors 172 are generally employed in an engine control system to ensure exhaust emissions from the exhaust of a vehicle system 150 are compliant with regulatory standards and requirements. One or more embodiments can be directed to an interface 111 that facilitates communication between testing equipment 110 and test specimen 140. Interface 111 can include a conversion device 130 and a communications interface 120. As described above, test specimen 140 can be configured to transmit and receive messages between the test equipment 110 and test specimen 140, such as with oxygen sensor 172 in the described examples. The testing equipment could use any form of communication architecture and technology including, but not limited to wireless Ethernet, CAN (and any technology subsets), LIN, FlexRay, Ethernet, Bluetooth® (and any technology subsets), serial data, and the like.

As described herein, test specimen 140 can transmit test information that includes data regarding the test specimen 140 to the testing equipment 110. Signals transmitted to the test equipment 110 may relate to any type of parameter that is input to, or output by, the test specimen 140 e.g., sensor commands, status, and data. For example, some test information could also include simulations of analog and digital sensor information or test cases. In the example of vehicle system 150 and an emission control systems, the test specimen 140 can transmit signals relating to exhaust gas temperatures and pressures, oxygen content, NOx content, among others, to testing equipment 110. It should also be appreciated that in some embodiments the communication may be directly to/from the testing equipment 110 to a particular component of the test specimen 140, e.g., oxygen sensor 172, while in others it may be through another component thereof (e.g., vehicle system 150, ECU 160).

As test specimen 140 is tested, test specimen 140 may generate messages to be transmitted to the testing equipment 110. The messages can include measured responses, status, diagnostic information, as well as changes in the operating characteristics, behavior, and the like. In an embodiment, testing equipment 110 receives and collects various information corresponding to various responses of the test specimen 140 as well as communication messages that may include information indicative of results and responses from the test specimen 140 based on the test messages (or subset thereof).

Figure 2:
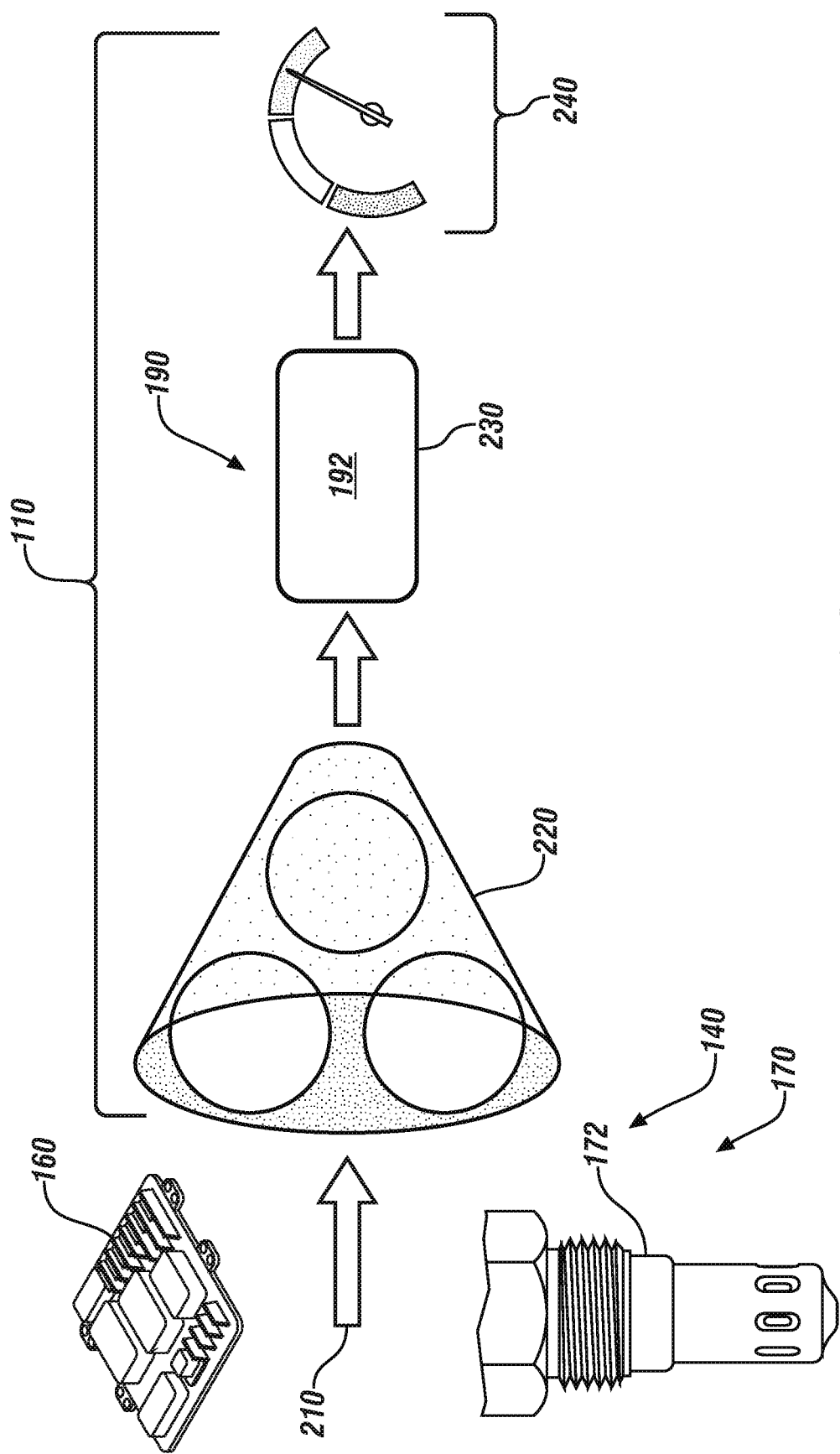
FIG. 2 illustrates a functional diagram of the processes of determining sensor status in accordance with one or more embodiments.

FIG. 2 depicts a high level block diagram illustration of the method of predicting performance over time of a test specimen 140, and in particular, as related to an example of oxygen sensor 172. In an example as described herein, the method is directed to predicting clogging of the oxygen sensor 172 in accordance with an embodiment. In operation, the oxygen sensor 172 is disposed in the exhaust gas stream of an exhaust system of the vehicle system 150 and is subject to clogging due to the accumulation of soot contained in the exhaust gas. Such clogging of the oxygen sensor 172 results in a slower measurement and response by the oxygen sensor 172 of the exhaust gases and particularly the oxygen level.

In the described embodiments, a method is described to predict clogging of the oxygen sensor 172 as it operates over time. The method includes a collecting a broad spectrum of date from a variety of sources including the vehicle system 150 as well sensor system 170 including oxygen sensor 172 as depicted by 210. A broad data analysis technique configured to identify and select the most representative signals and thereby, identify the minimum number of data signals capable of describing the phenomena, e.g., in an embodiment the status of and/or clogging of the oxygen sensor 172. The method also includes transforming the selected signals from time series data, to statistics, to identifying the most relevant data as is graphically depicted at 220. Further, the method includes elaborating on the most representative signals and classifying them as depicted at 230 with a neural network to obtain the health status of the oxygen sensor 172 (indication of clogging level) as shown at 240. Advantageously, this method can be employed off board (e.g., in a remote server or cloud-based processing environment) for prognostic purposes; leveraging existing connectivity the data transmitted from a vehicle system 150.

Figure 3A:
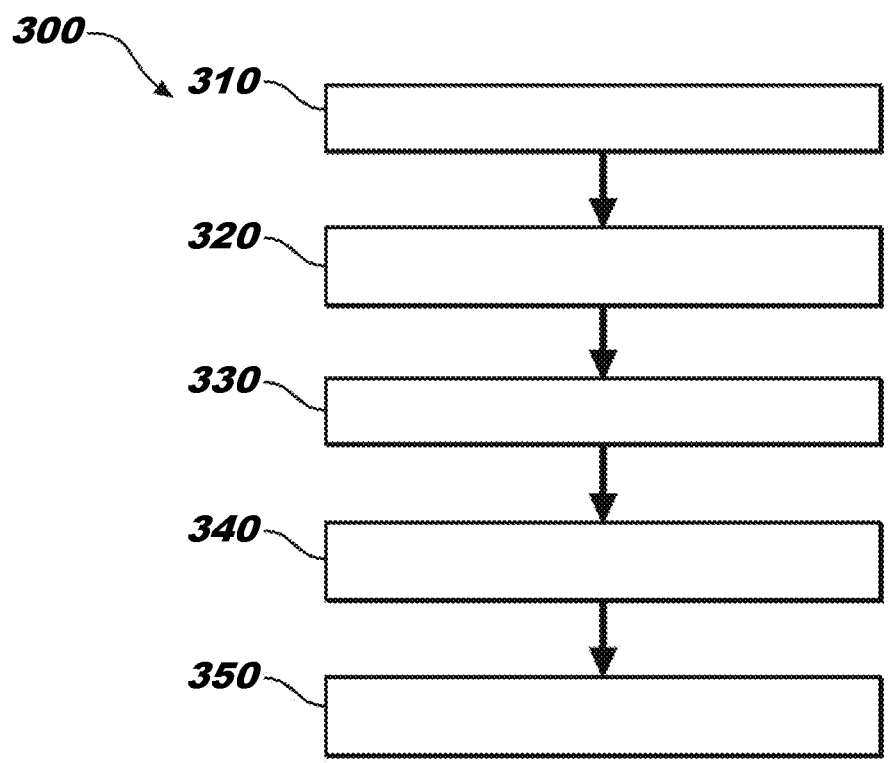
FIG. 3A depicts a flowchart of a method of determining sensor status in accordance with one or more embodiments.

Continuing with FIGS. 1 and 2, and turning now to FIG. 3A as well, a method 300 of predicting sensor degradation according to one or more embodiments is described. For explanatory purposes, a method of predicting clogging of an oxygen sensor 172 is specifically referenced. The method 300 initiates with process step 310 where collecting various sensor signals is depicted. In the exemplary embodiment, the data collection includes collecting data regarding operation of the vehicle system 150, sensor system 170 and more specifically the oxygen sensor 172. The data may include time history data of the sensed parameter (e.g., the oxygen sensing) as well as data associated with the sensor, for example, status, operating conditions, as well as data regarding the operation of the vehicle system 150. Moreover, it should be appreciated that collecting and processing such large amounts of data can be difficult and burdensome for onboard computing capabilities e.g., ECU 160. Therefore, advantageously, the described embodiments identify the most relevant data from all data collected for further processing and computations.

The method 300 continues with selecting the relevant data based on correlations between the variables as depicted at process step 320 in accordance with an embodiment. In an embodiment, a feature selection algorithm is designed to iteratively extract the most representative variables (data) from the initial pool of available signals of the data collected as described in further detail herein. At process step 330, the method 300 continues with optionally transforming the selected data associated with a given problem. That is, all variables now in the set S, (e,g the fourteen variables selected) a data transformation is implemented. For example, the optionally transforming can include expanding the data set to include various processes such as averaging, spectral (frequency based) filtering, derivatives, integrals, trigonometric functions, linear and non-linear mathematical functions, and statistical functions, and the like. In an embodiment, the optional transforming includes computing time based derivatives for a selected time interval or intervals associated with the selected data. In an embodiment the optional transforming includes a time based derivative over a selected time window. The selected time window can be as short as between data samples or over a plurality of sample periods. In an embodiment for the example given, a time based derivative is also computed for each selected variable with a time window of one sample. Therefore for each of the fourteen data signals selected in the example, there are a corresponding fourteen derivative data sets.

Continuing once again with FIG. 3, at process step 340 the method 300 continues with collecting further statistics regarding the selected variables. For example, statistics can include, but not be limited to, various percentiles, means, standard deviations, and the like. In an embodiment, the data, and their derivatives for a selected time window, also include further statistics regarding the data and its derivatives. For example, for each data variable and its derivative every tenth percentile (e.g., 10th, 20th, 30th . . . 90th), the mean, standard deviation are also computed and employed. Therefore in the example provided for the 14 specific variables selected, and their respective 14 derivatives, an additional 11 statistics are also computed and collected respectively, yielding 308 data signals.

The method 300 continues at process step 350 with classifying the selected data, computed data, and associated statistics. In an embodiment a classifier 190 is employed to characterize the data and determine the state of the oxygen sensor 172. In an embodiment, the classifier 190 is configured as a neural network 192, which is developed and trained to facilitate the classification using known training techniques. Artificial neural networks are known and designed to simulate biological neural systems. A neural network consists of an input layer, a number n of hidden (e.g., internal) layers, and an output layer. Each layer is made up of nodes. Each node in a layer takes as input a weighted sum of the outputs of all the nodes in the previous layer, and it applies a nonlinear activation function to the weighted input. The network is trained with training objects and applied algorithms including, but not limited to a backpropagation algorithm and learns by iteratively processing the set of training data objects. For each training data object, the network predicts the target value. Then, weights in the network nodes are modified to minimize the mean squared prediction error. These modifications are propagated backwards, that is, from the output layer through each hidden layer down to the first one.

In an embodiment, the neural network 192 employed is composed of 308 inputs with a single hidden layer of 400 nodes. An output layer has 3 nodes, one per each class associated with the condition of the oxygen sensor 172. In an embodiment three output classes denoted as "OK", "pre-alarm" and "alarm" corresponding to the condition of the oxygen sensor 172. The "OK classification identifies the oxygen sensor 172 as not clogged or clogging and operating properly. The "pre-alarm state corresponds to the condition that the oxygen sensor 172 is slightly clogged and beginning to exhibit degradation in performance, and the "alarm" state corresponds to a clogged oxygen sensor 172. An identity function is used as the activation function, however, other activation functions could be employed. The activation function ensures that the neural network 192 exhibits its non-linearity and maintains the ability to train the neural network 192.

A training phase for the neural network 192 is performed iterating multiple times through the inputs available, so as to tune the weights of all the layers of the neural network 192 according to the desired outputs. At each iteration, the weights of each neuron are adjusted based on how well the network behaved (when compared to an expected result) using backpropagation algorithms as is known in the art. Once trained, the data signals, computed data and statistics thereof are applied to the neural network 192. The neural network 192 generates the three outputs to define the predicted status condition of the oxygen sensor 172.

Figure 3B:
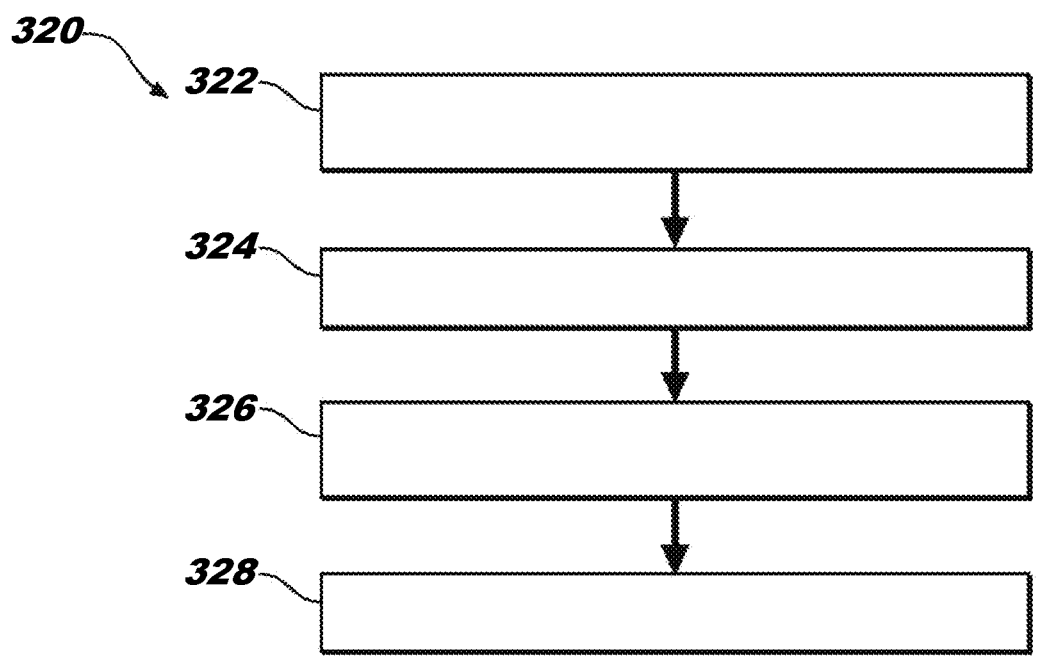
FIG. 3B depicts a flowchart of a method of determining sensor status in accordance with one or more embodiments.

FIG. 3B provides a flowchart depicting further details associated with the selecting the relevant data based on correlations process step 320 the method 300 in accordance with an embodiment. The feature selection algorithm is designed to iteratively extract the most representative variables (data) from the initial pool of available signals of the data collected, in order to have a list of independent ("independent" in terms of correlation) variables ordered by descending degree of representativeness of the other signals. That is, generically, to select a minimal set of variables that alone, can consistently represent all the information required for a given problem. The feature selection algorithm is an iterative algorithm that employs a correlation coefficient between two pieces of data to extract the relevant features. Further details of the steps of the selecting process 320 of the algorithms employed are as follows:

As depicted at process step 322, for each cycle k, (i.e., a driving cycle of the vehicle system 150, an operational cycle of the sensor system 170, or the oxygen sensor 172), and the like, the correlation coefficient between each pair of variables denoted arbitrarily as i and j is computed and stored as rk_ij=rk_ji.

For each pair of variables i and j, the overall correlation coefficient r_ij=r_ji is computed as the average correlation coefficient for that pair of variables over all the [n] cycles: r_ij=1/n*sum(rk_ij), (i.e., a summation over all n cycles). That is, for each of the pair an averaged correlation coefficient is computed over all the cycles as depicted at process step 324.

A first group of variables is named "remaining variables" L. To start, the group L is initialized including all the variables available. Likewise, a second group of variables is established, denoted as the list of "selected variables" S. This selected variables set S is initialized as empty (i.e., with no variables in the set to start).

For each variable i in the "remaining variables" set L, the sum of squared correlation coefficients si are computed as a summation for each variable j in L in an iterative fashion. That is:

$$s_i = \sum_{j \in L} r_{ij}^2 \qquad (1)$$

Once all i variables have been considered, the variable b (a particular one of the variables from L) with the highest correlation coefficient si in L is extracted from L and defined as the most representative of the remaining variables as depicted at process step 326.

Each of the variables v in the "remaining variables" set L such that r_vb>r_min are extracted from L. That is, to eliminate duplicates, the variables that exhibit correlation coefficients that are highest are eliminated. Once compared, the variable b is inserted into list S also as depicted in process step 326. That is, added to the selected variables list S. It should be appreciated that this refinement is generic, that is, it facilitates reductions in the number of variables employed that are descriptive of a given problem. In this manner a very large number of variables can be refined to obtain those few that are unique and not representative of others in the same group S. In an embodiment, the r_min parameter is tunable has been tuned based on using the elbow approach looking at the number of features selected for each value between 0 and 1. Elbow method is a heuristic approach to optimize a parameter, generally consisting of looking at the trend of the performance varying the value of the parameter. Where there is a slope of the trend change (i.e., the elbow shape), there is the value to be chosen. In an embodiment the value for r_min is selected as r_min=0.8.

If there are no more "remaining variables," (i.e., L is empty), then algorithm terminates. Otherwise for remaining variables i in the set L, the process continues with the next variable i and correlation coefficient computation until they are exhausted, that is, the "remaining variables" set L is empty.

Finally, as depicted at process step 328, the "selected variables" set S is now populated with all the selected variables that exhibit the highest correlation coefficients yet are not duplicative with one another. For example, in the example case where the above process is applied to data for the vehicle system 150 and more specifically the oxygen sensor 172, of a the various data available from the vehicle system fourteen specific variables are identified as relevant to identifying and quantifying oxygen sensor 172 performance. Following process step 328, the method 300 of FIG. 3A continues with process step 330 as described herein.

Figure 4:
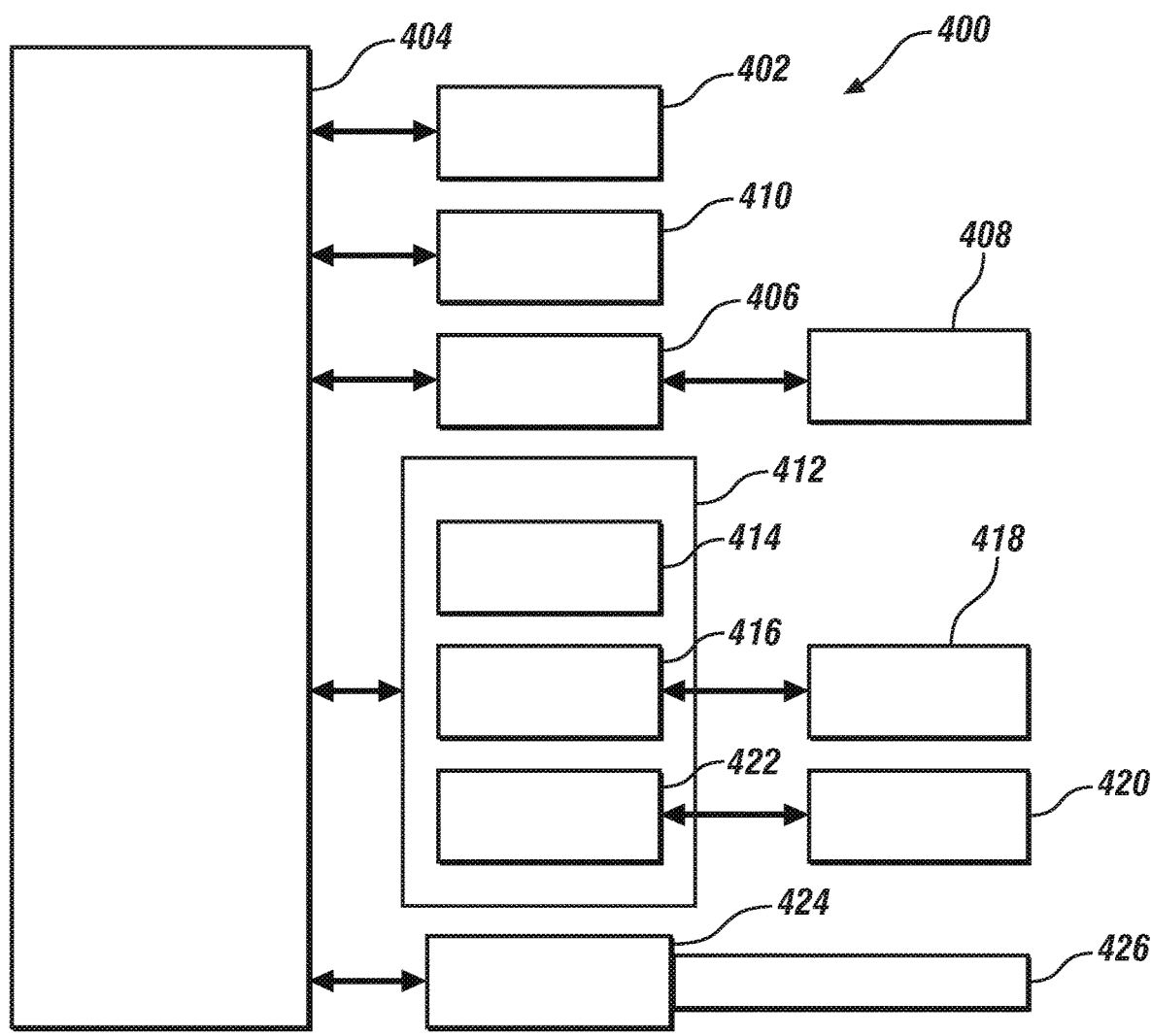
FIG. 4 depicts a high-level block diagram of a computing system, which can be used to implement one or more embodiments.

FIG. 4 depicts a high-level block diagram of a computing system 400, which can be used to implement one or more embodiments. Computing system 400 can correspond to, at least, a system that is configured to test various systems, for example. Computing system 400 can correspond to an interface device, a conversion device, and/or a network simulation device. Computing system 400 can be used to implement hardware components of systems capable of performing methods described herein. Although one exemplary computing system 400 is shown, computing system 400 includes a communication path 426, which connects computing system 400 to additional systems (not depicted). Computing system 400 and additional system are in communication via communication path 426, e.g., to communicate data between them.

Computing system 400 includes one or more processors, such as processor 402. Processor 402 is connected to a communication infrastructure 404 (e.g., a communications bus, cross-over bar, or network). Computing system 400 can include a display interface 406 that forwards graphics, textual content, and other data from communication infrastructure 404 (or from a frame buffer not shown) for display on a display unit 408. Computing system 400 also includes a main memory 410, preferably random access memory (RAM), and can also include a secondary memory 412. There also can be one or more disk drives 414 contained within secondary memory 412. Removable storage drive 416 reads from and/or writes to a removable storage unit 418. As will be appreciated, removable storage unit 418 includes a computer-readable medium having stored therein computer software and/or data.

In alternative embodiments, secondary memory 412 can include other similar means for allowing computer programs or other instructions to be loaded into the computing system. Such means can include, for example, a removable storage unit 420 and an interface 422.

In the present description, the terms "computer program medium," "computer usable medium," and "computer-readable medium" are used to refer to media such as main memory 410 and secondary memory 412, removable storage drive 416, and a disk installed in disk drive 414. Computer programs (also called computer control logic) are stored in main memory 410 and/or secondary memory 412. Computer programs also can be received via communications interface 424. Such computer programs, when run, enable the computing system 400 to perform the features discussed herein. In particular, the computer programs, when run, enable processor 402 to perform the features of the computing system. Accordingly, such computer programs represent controllers of the computing system. Thus it can be seen from the forgoing detailed description that one or more embodiments provide technical benefits and advantages.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the embodiments not be limited to the particular embodiments disclosed, but will include all embodiments falling within the scope of the application.

What is claimed is:

1. A method of determining status of a test specimen associated with a vehicle system, the method comprising:
    collecting, by a computing system, a plurality of data associated with a test specimen and the vehicle system;
    selecting a relevant data set of the plurality of data, comprising an iterative process of identification and extraction of representative variables from the plurality of data, the extraction based on a plurality of calculated correlation coefficients between each pair of variables of the plurality of data, wherein the extraction includes:
        determining a correlation coefficient for each pair of variables in the plurality of data based on an average correlation coefficient for each pair of variables in the plurality of data over a selected number of operating cycles;
        computing a sum square of the correlation coefficients;
        ascertaining a set of variables exhibiting the highest correlation, yet not duplicative with correlation coefficients for other variables; and
        extracting only variables that are not duplicative;
    transforming at least a portion of the selected relevant data set to form a transformed data set, the transforming based on mathematical properties;
    collecting statistics associated with the selected relevant data set and the transformed data set to form a statistics data set;
    classifying the selected relevant data set, transformed data set and the statistics data set; and
    predicting the status of the test specimen based on the classifying.

2. The method of claim 1, wherein the collecting comprises operating the vehicle system and acquiring the plurality of data over at least a portion of an operating cycle.

3. The method of claim 1, wherein the plurality of data comprises sensor data, an operating condition of the vehicle or a sensor, or status of any of the vehicle system, a sensor system, or the sensor.

4. The method of claim 1, wherein the plurality of data comprises a time history.

5. The method of claim 1, wherein the test specimen includes a sensor system and the sensor system includes an oxygen sensor, the oxygen sensor disposed in an exhaust gas stream of a motor vehicle.

6. The method of claim 1, wherein the transforming includes at least one of averaging, spectral filtering, derivatives, integrals, trigonometric functions, linear and non-linear mathematical functions, and statistical functions.

7. The method of claim 6, wherein the transforming is a derivative over a selected interval.

8. The method of claim 7, wherein the selected interval is a single sample interval.

9. The method of claim 1, wherein the collecting statistics comprises computing at least one of a percentile, a mean, and a standard deviation for at least one piece of data in the selected relevant data set and the transformed data set to form the statistics data set.

10. The method of claim 1, wherein the classifying the selected relevant data set, transformed data set, and the statistics data set comprises applying the selected relevant data set, transformed data set, and the statistics data set to a neural network.

11. The method of claim 10, wherein the neural network comprises an input layer having 308 inputs a first hidden layer have 400 nodes, and an output layer having 3 nodes, the three nodes of the output corresponding to a class associated with a condition of the sensor.

12. The method of claim 10, further comprising training the neural network based on iterating through the at least a portion of the selected relevant data set, transformed data set, and the statistics data set to adjust weights given to each neuron of the neural network.

13. The method of claim 1, wherein the predicting a status of the test specimen based on the classifying identifies the test specimen exhibiting at least one of three states, the three states defined as an OK state, a Pre-alarm state, and an Alarm state.

14. A system for determining a status of a test specimen, the system comprising:
 a test specimen associated with a vehicle system having at least a sensor system, the sensor system having at least one sensor; and
 a computing system in operable communication with at least the at least one sensor of the sensor system and the vehicle system, the computing system configured to execute a method of determining status of the test specimen comprising:
  collecting, by the computing system, a plurality of data associated with a test specimen;
  selecting a relevant data set of the plurality of data, comprising an iterative process of identification and extraction of representative variables from the plurality of data, the extraction based on a plurality of calculated correlation coefficients between each pair of variables of the plurality of data, wherein the extraction includes:
  determining a correlation coefficient for each pair of variables in the plurality of data based on an average correlation coefficient for each pair of variables in the plurality of data over a selected number of operating cycles;
  computing a sum square of the correlation coefficients;
  ascertaining a set of variables exhibiting the highest correlation, yet not duplicative with correlation coefficients for other variables; and
  extracting only variables that are not duplicative;
  transforming at least a portion of the selected relevant data set to form a transformed data set, the transforming based on mathematical properties;
  collecting statistics associated with the selected relevant data set and the transformed data set to form a statistics data set;
  classifying the selected relevant data set, transformed data set and the statistics data set; and
  predicting the status of the test specimen based on the classifying.

15. The system of claim 14, wherein the plurality of data comprises at least one of sensor data, an operating condition of the vehicle or the sensor, and status of any of the vehicle system, a sensor system and the sensor.

16. The system of claim 14, wherein the sensor system includes an oxygen sensor, the oxygen sensor disposed in an exhaust gas stream of a motor vehicle.

* * * * *